United States Patent [19]
Leonardi

[11] Patent Number: 6,079,159
[45] Date of Patent: Jun. 27, 2000

[54] WINDOW STABILIZER

[76] Inventor: Hugo Leonardi, 2208 Dryken Rd., Metamora, Mich. 48455

[21] Appl. No.: 09/359,571

[22] Filed: Jul. 22, 1999

[51] Int. Cl.$^7$ .................................................. E05D 13/00
[52] U.S. Cl. ................................................................ 49/415
[58] Field of Search ............................. 49/372, 374, 376, 49/378, 404, 425, 428, 436, 414, 415, 416, 420, 423

[56] References Cited

U.S. PATENT DOCUMENTS

| | | | |
|---|---|---|---|
| 1,096,813 | 5/1914 | Edwards | 49/415 |
| 1,211,860 | 1/1917 | Kirby | 49/415 |
| 2,047,047 | 7/1936 | Wirth | 49/415 X |
| 5,248,539 | 9/1993 | Leonardi | 428/88 |
| 5,771,637 | 6/1998 | Oikawa et al. | 49/414 |
| 5,943,823 | 8/1999 | Yoshida et al. | 49/414 X |

FOREIGN PATENT DOCUMENTS

| | | | |
|---|---|---|---|
| 467327 | 8/1950 | Canada | 49/415 |

*Primary Examiner*—Jerry Redman
*Attorney, Agent, or Firm*—Gifford, Krass, Groh, Sprinkle, Anderson & Citkowski, P.C.

[57] ABSTRACT

A window stabilizer for a window pane, such as those used in automotive vehicles, is disclosed. The window stabilizer includes a bracket and a first and second roller. An axle is associated with each roller for rotatably mounting the roller to the bracket so that the axes of rotation of the rollers are spaced apart and parallel to each other. Furthermore, the spacing between the rollers is such that the rollers engage opposite sides of the window pane thus stabilizing the window pane during movement and while stationary.

6 Claims, 1 Drawing Sheet

WINDOW STABILIZER

BACKGROUND OF THE INVENTION

I. Field of the Invention

The present invention relates to a window stabilizer for use in automotive vehicles.

II. Description of the Prior Art

Many types of motor vehicles include one or more windows which are slidably mounted within a panel on the vehicle. For example, in a passenger car, the side window is conventionally slidably mounted within the door panel and movable between a raised or closed position and a lowered or open position.

In order to prevent or at least minimize rattling of the window within its associated vehicle panel, many previously known motor vehicles utilize window stabilizers which are mounted to the interior of the vehicle panel. Typically, these previously known window stabilizers include a bracket mounted to the vehicle panel and one or two pads mounted to the bracket which engages the window pane. These pads, which may be biased against the window, are typically constructed of a synthetic material, such as nylon. Many of these pads include bristles which contact the window pane.

These previously known window stabilizers, however, have not proven entirely effective in operation. One disadvantage of these previously known window stabilizers is that the bristles from the pad dislodge during repeated operation of the window thus wearing away the pad. After prolonged use of the window stabilizer, the bristles on the pad are largely worn away from the pad so that the pad no longer adequately contacts the window pane. When this occurs, rattling and erratic operation of the window can result.

SUMMARY OF THE PRESENT INVENTION

The present invention provides a window stabilizer which overcomes all of the above-mentioned disadvantages of the previously known window stabilizers.

In brief, the window stabilizer of the present invention comprises a bracket which is typically mounted within the interior of a door or body panel. A first roller is rotatably secured to the bracket by a first axle while, similarly, a second roller is rotatably secured to the bracket such that the second roller is rotatable about an axis parallel to but spaced apart from the axis of the first roller.

Preferably, a resilient sleeve is disposed around each roller. Furthermore, the rollers are spaced apart from each other by a distance such that the resilient sleeves of the rollers engage and slightly compress against opposite sides of a window pane. Thus, during operation of the window, i.e. movement between its open and closed positions, the resilient sleeves on the rollers engage the window pane and stabilize its operation.

Unlike the previously known window stabilizers with synthetic pads, the window stabilizer of the present invention, due to the rotation of its rollers during operation or movement of the window, do not wear away or otherwise erode the rollers or their associated sleeves. Thus, unlike the previously known window stabilizers, the window stabilizer of the present invention retains its effectiveness despite prolonged and repeated use.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
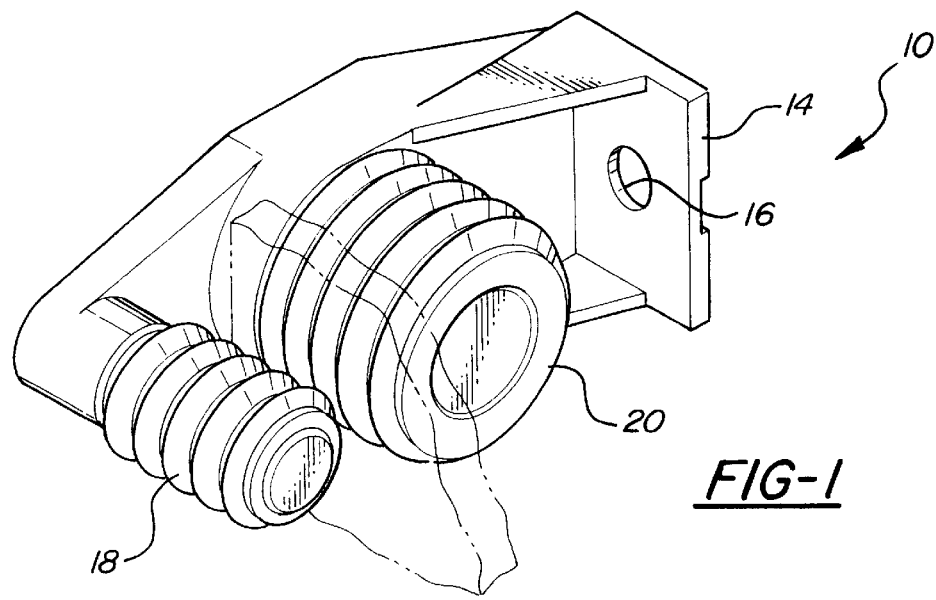
FIG. 1 is a perspective view illustrating a preferred embodiment of the window stabilizer of the present invention.

With reference first to FIG. 1, a preferred embodiment of the window stabilizer 10 of the present invention is there shown and comprises a bracket 14 constructed of any suitable material, such as plastic. The bracket 14 is typically mounted by any conventional means within the interior of an automotive body panel, such as a door panel. Suitable mounting hole(s) 16 are provided through the bracket 14 to facilitate attachment of the bracket 14 to the vehicle body panel (not shown).

The window stabilizer 10 further includes a pair of rollers 18 and 20 which are rotatably mounted to the bracket 14 such that the rollers 18 and 20 are spaced apart and parallel to each other. Furthermore, although the rollers 18 and 20 may be of the same size, in the preferred embodiment of the invention, the roller 20 is of a larger diameter than the roller 18.

Except for their size, the rollers 18 and 20 are substantially identical to each other. Consequently, only a detailed description of the roller 20 will be provided, it being understood that a like description shall also be applicable to the roller 18.

Figure 2:
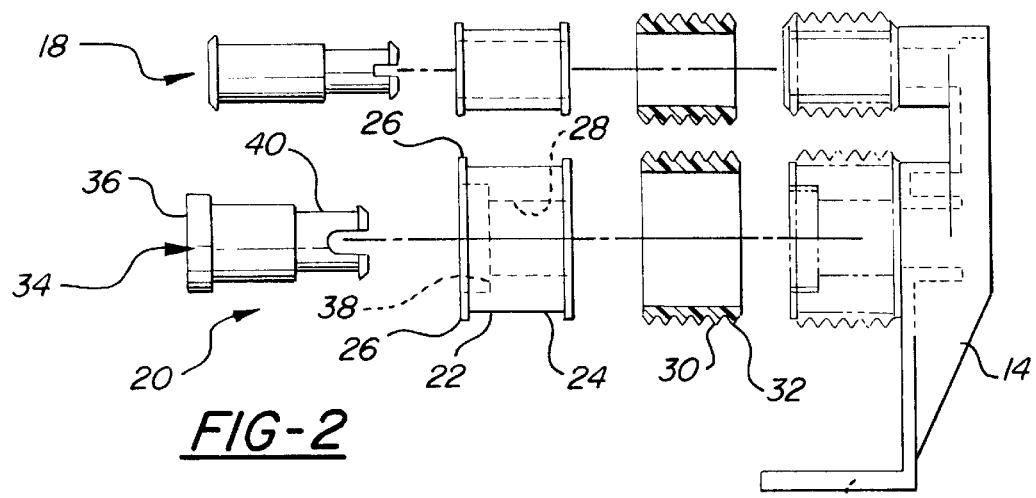
FIG. 2 is an exploded view illustrating the preferred embodiment of the present invention.
Figure 3:
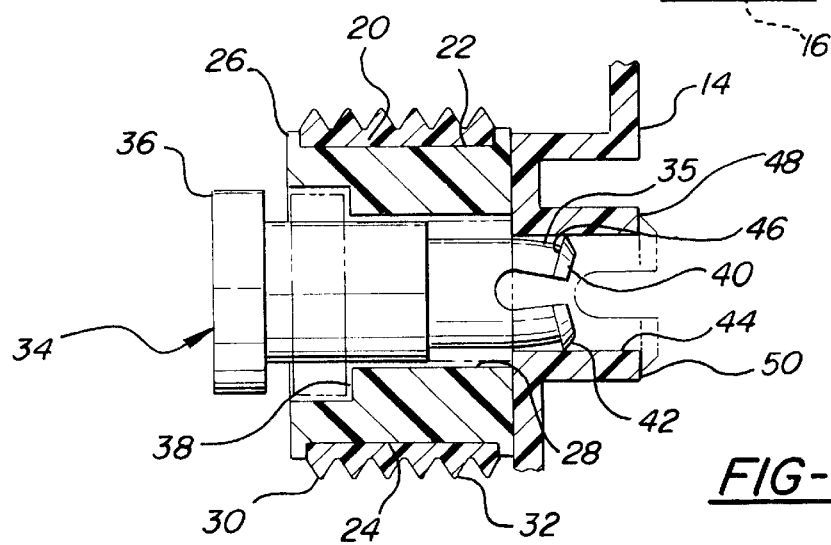
FIG. 3 is a fragmentary diagrammatic view illustrating a portion of the preferred embodiment of the present invention.

With reference then to FIGS. 2 and 3, the roller 20 includes a tubular and cylindrical support 22 having an outer cylindrical surface 24. A radially outwardly extending retaining lip 26 is also provided at each end of the support 22. The roller support 22 includes an axial throughbore 28 and preferably the roller support 22 is of a one piece plastic construction.

Still referring to FIGS. 2 and 3, a tubular cylindrical sleeve 30 constructed of a resilient material is disposed around the cylindrical surface 24 of the roller support 22 such that the sleeve 30 is positioned in between the lips 26. Furthermore, the sleeve 30 preferably includes a plurality of circumferentially extending and longitudinally spaced ridges 32 around its outer periphery.

In order to attach the roller support 22 with its sleeve 30 to the bracket 14, a cylindrical axle 34 is coaxially disposed through the roller support bore 28. The axle 34, which preferably is of a one piece plastic construction, includes an enlarged head 36 at one end which abuts against an abutment surface 38 on the roller support 22 in order to retain the roller support 22 to the axle 34. The other end 40 of the axle 34 is secured to the bracket 14.

With reference now especially to FIG. 3, although any means can be used to attach the end 40 of the axle 34 to the bracket 14, preferably the axle 34 includes a reduced diameter portion 35 adjacent its end 40. Two or more outwardly projecting resilient tabs 42 are attached to the free end of the reduced diameter portion 35 of the axle 34.

The bracket 14 includes a receiving opening 44 which is substantially the same diameter as the reduced diameter portion 35 of the axle 34. Thus, with the roller support 22 and sleeve 30 mounted to the axle 34, the reduced diameter portion 35 of the axle is inserted through the bracket opening 44. In doing so, the tabs 42 compress slightly radially inwardly thus allowing the reduced diameter portion 35 of the axle 34 to pass through the opening 44. Upon complete insertion of the portion 35 of the axle 34 through its receiving opening 44, an abutment surface 46 at the inner end of the axle reduced diameter portion 35 abuts against the one side 48 of the bracket 14. Simultaneously, the resilient tabs 42 flex radially outwardly as shown in phantom line and frictionally engage the opposite side 50 of the bracket 14 thus locking the axle 34 with its attached roller support 22 to the bracket 14.

The diameter of the axle 34 is slightly less than the diameter 28 of its roller support 22 while, similarly, the longitudinal length of the axle 34 is slightly greater than the axial length of the throughbore 28. Consequently, upon attachment of the axle 34 to the bracket 14 in the previously described fashion, the roller support 22 with its associated sleeve 30 freely rotates about the axle 34.

The other roller 18 is also secured to the bracket 14 in substantially the identical fashion so that a further description is unnecessary.

With the rollers 18 and 20 secured to the bracket 14 as in the previously described fashion, the outer periphery of the sleeves 30 are spaced from each other by a distance slightly less than the thickness of the window pane so that the sleeves 30 slightly compress against the window pane. During operation of the window between its raised and lowered position, the rollers 18 and 20 rotate in synchronism with the movement of the window pane. Simultaneously, the sleeves 30 slightly compress against the window thus stabilizing the window from rattling and other erratic behavior.

From the foregoing, it can be seen that the window stabilizer of the present invention provides a simple and yet totally effective mechanism for stabilizing a window of the type found in automotive vehicles. Having described my invention, however, many modifications thereto will become apparent to those skilled in the art to which it pertains without deviation from the spirit of the invention as defined by the scope of the appended claims.

I claim:

1. In combination with a single window pane, a stabilizer comprising:

a bracket, a first roller, a first axle which rotatably mounts said first roller to said bracket about a first predetermined axis, a second roller, a second axle which rotatably mounts said second roller to said bracket about a second predetermined axis, said second predetermined axis being spaced apart and parallel to said first predetermined axis, wherein said rollers are spaced apart from each other by a distance such that said rollers engage opposite sides of said single window pane.

2. The invention as defined in claim 1 wherein each roller comprises a tubular cylindrical support and a tubular cylindrical sleeve disposed around said support, said sleeve being constructed of a resilient material.

3. The invention as defined in claim 2 wherein each axle extends through its associated support, said axle having an enlarged head at one end which abuts against one end of its associated support, and means for attaching the other end of each axle to said bracket.

4. The invention as defined in claim 3 wherein said bracket includes a pair of spaced openings, one opening being aligned with each axle, and wherein said attaching means comprises a resilient outwardly protruding tab at said other end of said axle, said tab compressing radially inwardly upon insertion of said other end of said axle into its associated opening, said tab flexing radially outwardly upon complete insertion into its associated opening and functionally engaging a side of said bracket opposite said rollers.

5. The invention as defined in claim 4 wherein said axles are each of a one piece plastic construction.

6. The invention as defined in claim 2 wherein each sleeve comprises a plurality of longitudinally spaced and circumferentially extending ridges extending outwardly around its outer periphery.

* * * * *

UNITED STATES PATENT AND TRADEMARK OFFICE
CERTIFICATE OF CORRECTION

PATENT NO. : 6,079,159
DATED : Jun. 27, 2000
INVENTOR(S) : Hugo Leonardi

It is certified that error appears in the above-indentified patent and that said Letters Patent is hereby corrected as shown below:

Column 4, line 34-35 - Replace "functionally" with --frictionally--

Signed and Sealed this

Tenth Day of April, 2001

Attest:

NICHOLAS P. GODICI

Attesting Officer     Acting Director of the United States Patent and Trademark Office